3,459,531
METHOD OF THERMALLY EXPANDING VERMICULITE IN A HOT LIQUID AND PRODUCT PREPARED BY SAID PROCESS
Judson K. Chapin, Jr., Greenville, S.C., and David W. Robinson, Libby, Mont., assignors to W. R. Grace & Co., New York, N.Y., a corporation of Connecticut
No Drawing. Filed Feb. 16, 1966, Ser. No. 527,765
Int. Cl. C05b 7/00; C04b 31/26
U.S. Cl. 71—62
11 Claims

ABSTRACT OF THE DISCLOSURE
Vermiculite is thermally expanded in a mixture of liquid plant nutrients to produce a fertilizer.

This invention relates to an improved method of expanding vermiculite and other thermally expanding materials, incorporating materials into the thermally expanding materials during their expansion, and utilizing the thermally expanded material as a carrier for the materials so incorporated, and to the thermally expanded products.

The following abbreviations are used in this application. 24–12–0, 20–10–10 and similar series which represents the grade or analysis of a fertilizer. These and similar series represents the N-P-K or nitrogen-phosphorus-potash values of a fertilizer expressed as the ratio in weight equivalent of $N-P_2O_5-K_2O$. The phorphorus is expressed as $P_2O_5$ and the potash as $K_2O$ even though the elements may actually be present in other chemical forms.

In summary, a vermiculite or like thermally expanding material is expanded by preparing a mixture of a non-gaseous heat carrier and the thermally expanding material. The non-gaseous heat carrier is heated to a temperature above 212° F. The thermally expanding material is expanded in the above 212° F. heat carrier.

In one preferred form, a 20–10–10 fertilizer is prepared by making a 450–500° F. molten salt mix of 4 parts potassium nitrate, 3 parts monoammonium phosphate, and 8 parts ammonium nitrate in a melting pot. Unexpanded No. 3 vermiculite in the amount of 15% by weight of the combined vermiculite-salt mix weight is added to the molten salt mix while the mixture is mildly agitated. After the vercimulite has expanded and taken up substantially all of the molten salts, the plastic mass is removed from the melting pot. The mass is placed on a cool surface, broken up and screened to size.

By way of specific illustration of a particular embodiment of my invention, my invention will be described as it is utilized in connection with the production of certain plant nutrient products, although, it is to be clearly understood that this is an illustrative embodiment only and is not to be construed in a limiting sense.

Vermiculite is a thermally expanding material that is a very satisfactory agricultural material. It has been exfoliated and used as an ingredient in dry blend fertilizers to prevent hard caking and as a soil conditioner. It has also been put to other agricultural uses, for example, vermiculite is used as a rooting medium for propagating cuttings.

Vermiculite is a micaceous mineral, chemically identified as a hydrated magnesium-aluminum-iron silicate and characterized by a platelet structure which exfoliates or expands when heated or subjected to various chemical treatments so as to be increased to several times its original size and trap within itself thousands of minutely sized air cells. The mineral occurs naturally in an unexpanded state, and is mined in a conventional manner.

Since vermiculite as it is mined in the form of vermiculite ore is associated with other minerals as impurities, the crude vermiculite ore, after being reduced to particle size, has generally been beneficiated by various concentrating methods well known in the art wherein the gangue material is separate from the vermiculite particles as much as possible. After the vermiculite is separated from the gangue it is usually screened into a number of component sizes or grades. These are normally shipped to facilities located near the site of ultimate use for expansion or exfoliation. Some vermiculite is used in unexpanded form.

In the past, vermiculite has been expanded in most instances by dropping the milled vermiculite ore in a continuous stream through a furnace, the chamber temperature of which generally ranges from about 1400 to 2200° F. Incomplete expansion has been obtained when the vermiculite was subjected to furnace temperatures as low as 800° F. Chemical methods of expanding vermiculite have also been used in the past. The chemical methods of expanding vermiculite are generally relatively slow compared to the thermal methods. In one chemical process for expanding the vermiculite the vermiculite is submerged in a hydrogen peroxide bath to bring about expansion. An improvement in the furnace method of expanding vermiculite the vermiculite has been subjected to saline solution baths, followed by washing with fresh water that was heated to 150° F. This increased the water content of the vermiculite and expansion was increased to 125% of that normally achieved. The saline solution bath and fresh water washing treatment brings about a small swelling of the vermiculite, about a 54% increase in size over untreated and unexpanded vermiculite.

Vermiculite has also been subjected to sulfuric acid baths in the past. The acid leaches out practically all basic constituents of the ore leaving a highly porous silica residue that retains the flaky laminar structure of the ore and exhibits no observable expansion of the vermiculite particles.

In the past, when vermiculite was used as a carrier it was usually expanded and then the material to be carried by the vermiculite was sprayed or poured on the expanded vermiculite particles. Depending upon the nature of the material, the material either adhered to the outside of the vermiculite particles or filled the interstices of the expanded vermiculite particles or both.

In practicing my invention the following procedural steps are normally followed, although, in certain instances some of the steps can be combined. First, a hot fluid mixture of the material that is to be combined with the vermiculite is prepared and heated preferably to a temperature of 400 to 550° F., and for good results at least to 320° F. This hot fluid is moderately stirred while finely divided vermiculite is added at a rate that will permit the vermiculite to submerge almost immediately in the hot fluid. The vermiculite is preferably added in an amount constituting 5 to 20% of the end product on a weight basis. The vermiculite should be number 3 or number 4 vermiculite for best results. Number 3 vermiculite is predominately through an 8 mesh U.S. Standard screen but not a 16 mesh U.S. Standard screen. Number 4 vermiculite is predominately through a 16 mesh U.S. Standard screen but not a 30 mesh U.S. Standard screen.

The hot plastic mass which includes the expanded vermiculite and the adsorbed hot fluid mixture is cooled, hardened and broken up. Then it is screened to size for shipment or use.

In one preferred form of my invention I prepare a molten liquid mix that is solid at normal ambient temperature, about 0–100° F. This can be done using the following materials which have excellent fertilizer or agricultural nutrient value: potassium nitrate, monoammonium phosphate, ammonium nitrate, monopotassium phosphate, sodium nitrate, calcium nitrate and magnesium nitrate and any other material that has a eutectic melting point in combination with one or more of the listed salts under 500° F., stability at that temperature and that contains valuable primary or trace elements suitable for fertilizer use.

While the size of the unexpanded vermiculite that is to be used is not very critical, the size does effect the quantity of vermiculite required to take up the liquid phase. When No. 3 vermiculite was used a quantity equaling 10 to 15% by weight of the final product weight was required. When No. 4 vermiculite was used from 15 to 20% by weight was required. Of course, if the particle size is much less than through 100 mesh U.S. Standard screen there will not be sufficient interstices to effectively take in the molten salts and bring about the desired degree of expansion and so the process cannot be carried out in a desirable manner. Relatively low quality vermiculite has been used in this process with excellent results. So long as the vermiculite has good expansion qualities there does not seem to be any direct relationship between the quality of the vermiculite and its suitability for use in this process. For example, the friability of the vermiculite has not been found to result in any significant difference in the quality of the product.

A wide range of N-P-K ratios can be obtained practicing this process with ammonium nitrate, potassium nitrate and monoammonium phosphate salt melts. In some instances, the use of monopotassium phosphate in the salt melt increases the number of formulations possible and makes formulation simpler. Some of the fertilizer grades that can be obtained are shown in Table I.

TABLE I

Include proportions shown with 15% vermiculite No. 3 on an end product weight basis.

| Grade | | | | | | | | | | |
|---|---|---|---|---|---|---|---|---|---|---|
| | N | 16 | 20 | 22 | 24 | 22 | 25 | 16 | 21 | 18 |
| | P | 14 | 10 | 8 | 12 | 22 | 8 | 14 | 14 | 9 |
| | K | 16 | 10 | 8 | 0 | 0 | 0 | 16 | 7 | 18 |
| Ammonium nitrate (35% N) | P | 2 | 8 | 9 | 16 | 13 | 166 | 3 | 11 | 9 |
| Monoammonium phosphate (12-61-0) | A | 2 | 3 | 2 | 5 | 9 | 31 | ------ | 1 | 2 |
| Potassium nitrate (13-0-44) | R | 3 | 4 | 3 | ------ | ------ | ------ | 1 | ------ | 8 |
| Monopotassium phosphate | T | | | | | | | | | |
| Monopotassium phosphate (0-51-34) | S | | | | | | | 2 | 4 | 2 |

In some instances, it is desirable to use the raw ingredients that are compounded to make the higher quality salts rather than the more expensive salts in preparing the melt materials. For example, on occasion it is desirable to charge 75% wet process phosphoric acid or 85% furnace acid into the melting vessel and ammoniate the acid with about 4.8 lbs. of ammonia per unit of $P_2O_5$ (1 unit of $P_2O_5$ is 1%/ton) to produce monoammonium phosphate. The heat of reaction from ammoniation raises the temperature of the ammoniated phosphoric acid and if any water remains in the monoammonium phosphate, which is a solid at room temperature, the water is evaporated by the time the temperature is raised to 350° F. Formulations that include monoammonium phosphate are given in Table I.

The B.t.u.'s of heat required to carry out the process with a molten salt melt are substantially under the number that would be required to produce a dry vermiculite fertilizer product if a material that is a liquid at ambient temperatures is used. For example, only 45 B.t.u.'s are required to melt 1 pound of potassium nitrate as compared to approximately 1000 B.t.u.'s being required to vaporize 1 pound of water. Heat transfer in the melt is excellent compared to that of hot gas, as evidenced by the fact that vermiculite exhibits excellent expansion at 400 to 450° F. in the salt melt while temperatures of 1600 to 2000° F. are required in hot gas furnace treatments. The molten salts act as an excellent heat carrier or conductor to bring about expansion of the thermally expanding vermiculite.

When salt melts are used, only ambient cooling is needed because in salt melts, such as the ones described by way of example, any water which may have been present is evaporated in the melting process and the molten materials solidify at temperatures above 200° F. The molten mass may be cooled by dispersing the mass in a tower and allowing it to cool as it falls in small unit sizes or by allowing the mass to harden and then breaking the mass up in a breaker.

In either instance, for normal use, it would be contemplated that the particles would need to be screened to size. Of course, a person skilled in the art could readily provide other means of cooling and granulating the mass.

Generally speaking, the process can be adapted to continuous or batch operation. In the ordinary situation it is only necessary to maintain physical and chemical properties of the mass in substantially the desired ratios and the temperature between 400 and 450° F. to produce an excellent product. It is generally not necessary to maintain other operating conditions or the conditions of granulation at optimal levels. In addition, the equipment used need not be of a highly sophisticated nature.

The products produced in accordance with the invention have been observed to have a high density and hardness of particle that would indicate a very complete penetration of the vermiculite latice by the salt melt. Even though many of the materials incorporated into the vermiculite are quite hygroscopic and have a pronounced tendency to cake when used in fertilizers, the product produced by this invention has been found to remain perfectly free flowing even when left open in high humidity. The reduction in hygroscopisity has been such that the product develops no stickiness when it contains materials that are separately very hygroscopic. The product has a low water content after granulation without requiring additional processing to further dry it out. It is believed that when a granular nitrate fertilizer is prepared according to this invention the explosion hazard is reduced. The product also tends to be very resistant to lumping and reagglomeration. Even a straight ammonium nitrate-vermiculite product exhibits good granular properties. Generally, the individual particles are of a substantially homogeneous composition and therefore there is no segregation of the ingredients.

The bulk density of the product generally varies between about 40 and 60 pounds per cubic foot. This is not a light weight product, but the inherent tough structure appears to be ideal for use in cyclone applicators. The products have been found to have a very firm particle structure. After screening they are relatively dust free and remain dust free.

Generally, a very low percentage of fines is produced and these fines can be readily recycled by feeding them into the mass during processing. The particle size of the product is to a considerable extent determined by the particle size of the unexpanded vermiculite. When the mass is broken up as it solidifies the weakest points and the points most likely to fracture are between the particles of the original vermiculite where the particles are stuck together. If solidification is not complete at the time of granulation this separation is particularly easy. Thus, unless special means are to be used to further reduce the particles sizes, the end product particles will generally be about the same size as the expanded particles of the original vermiculite. In the usual procedure some of the expanded vermiculite particles are broken during processing, some salt particles are broken away from the vermiculite and some agglomeration of multiple particles occurs, but the individual vermiculite sized particles are predominant if care is taken to properly break the particles away from one another, using the right amount of mechanical breaking action at the right stage of their solidification. For example, No. 3 vermiculite which is predominately through 8 and on 16 U.S. Standard mesh screen usually produces a granulated fertilizer that has a particle size of predominately through 8 and on 16 U.S. Standard mesh screen.

My invention provides a means of producing fertilizers having desirable physical properties that are substantially free of non-nutrient ions such as $Cl^-$ and $Na^+$. Under conditions in which the soil does not have a good natural leach rate the non-nutrient ions contained in most dry, bulk blended fertilizers can accumulate in the soil and build up high salt levels that are toxic to plants. The essential nutrient ions are removed from the soil by the plants and fertilization to replace these essential nutrients will continually add the non-nutrient ions which are not removed by the plants. This is particularly important in fertilizing crops that are very sensitive to high salt residues in the soil, tobacco, for example. A premium price is paid for low salt residue fertilizers when the fertilizer is to be used on a salt sensitive crop. In some cases the non-nutrient ions build up to such levels, particularly on irrigated land, that artificial leaching is necessary. This leaching not only consumes valuable water but leaches out nutrient salts with the non-nutrient salts.

Furthermore, it is believed that the leaching pattern of the product produced by this invention is very desirable for most uses where excess leaching is a problem. The salts adhering to the outside of the vermiculite particles dissolve at a very rapid rate while the salts inbetween the layers of the exfoliated vermiculite appear to dissolve more slowly. The salts inbetween the vermiculite platelets appear to dissolve only as water is able to penetrate inbetween the platelets by slowly dissolving the salts as it penetrates inwardly.

Many other materials can, of course, be incorporated into vermiculite using the teachings of this invention. For example, elemental sulfur can be introduced into vermiculite in the manner described in Example 3. If a material with a low flash point, such as elemental sulfur, is to be used it may be desirable to blanket the molten material with an inert gas to prevent flashing. In Example 3, rather than covering the sulfur with an inert gas the process was carried out at a lower temperature. The temperature of the molten sulfur was only 350–380° F. Sulfur is also easier to handle at this temperature because it becomes more viscous at higher temperatures. However, at the lower temperatures the vermiculite expansion was less complete and it was necessary to add 20 to 30% vermiculite to the molten sulfur on an end product weight basis, to provide for the substantially complete adsorption of the sulfur by the vermiculite.

It may be desirable in certain instances, such as in Example 4, to operate at a relatively low temperature level using salts or other materials that are molten at that temperature level and yet produce a product including a material that is solid at the operating temperatures. This can be done by preparing the molten salt mix and expanding the vermiculite in the molten mix. After the vermiculite has adsorbed substantially all of the molten salts the material that is a solid at the operating temperature is thoroughly mixed into the molten mass. The molten salts adhering to the outer surface of the vermiculite particles appear to serve as a binder to bind the solid material to the outside of the vermiculite particles. The mass can be cooled and broken up as described above. In some instances it may be desirable to add the solids before the vermiculite is added.

The invention is similarly useful for combining materials that are too large to gain entrance between the platelets of the expanded vermiculite. These particles may be physically combined with the vermiculite particles by being bound to the particles by the molten material. In addition, urea formaldehyde can be used as an exterior coating to reduce the solubility of the product. This can be done by removing the plastic mass, including the molten salts and the vermiculite, from the melting vessel and after it has partially cooled, but while it is still plastic, thoroughly mixing the urea formaldehyde into the mass as the mass is broken up. Various other combinations of introducing materials between the platelets and coating the outside of the exfoliated particles are also possible.

The following examples describe without limiting the invention.

Example 1

A 22–22–0 fertilizer was prepared in the following manner. 1050 grams of ammonium nitrate (35% N) and 720 grams of monoammonium phosphate (12–61–0) were added to a 5 liter stainless steel, round bottom melting vessel and heated to a temperature of about 450° F. The materials were a molten mass at this temperature. The molten salt mix was manually agitated in the melting vessel using a stainless steel spatula. 250 grams of unexpanded No. 3 vermiculite was added to the molten mass at a substantially constant rate over a period of 1 to 2 minutes while agitation was continued. The vermiculite submerged in the hot liquid immediately as it was added to the hot liquid mass.

The vermiculite adsorbed substantially all of the molten salt mix within 2 minutes after the completion of the vermiculite addition. The vermiculite salt mix mass was semi-solid, very pliable and workable. The vermiculite particles were expanded but appeared to retain their solid state and there appeared to be a sufficient coating of the molten salts on the outside of the particles to provide a lubricating effect between them.

The entire mass was scrapped out of the melting vessel after the salt was adsorbed by the vermiculite. The mass was placed on a smooth flat stainless steel table top where it was manually broken up with the spatula as it cooled and hardened. The material was then screened through 8 and on 16 U.S. Standard screen size. A very small quantity of fines passed through the screen and was recovered and added to the melting vessel during the processing of a subsequent batch immediately after the completion of the vermiculite addition.

The vermiculite was expanded. The product had a density of about 50 lbs./cu. ft., was hard, relatively dust free, free flowing, exhibited substantially little effects from hygroscopicity when held in 2 ply paper bags for a period of 3 months and did not cake.

Example 2

A 22–10–10 fertilizer was prepared using the procedure of Example 1 except 985 grams of ammonium nitrate (35% N), 330 grams of monoammonium phosphate (12–61–0) and 455 grams of potassium nitrate (13–0–44) were added to the melting vessel.

The vermiculite adsorbed substantially all of the molten salt mix within 2 minutes after the completion of the vermiculite addition and the mass had substantially the same characteristics as the mass in Example 1.

The entire mass was scraped out of the melting vessel broken up and screened as in Example 1. A very small quantity of fines passes through the screen and was recovered and added to the melting vessel during the processing of a subsequent batch immediately after the completion of the vermiculite addition.

The vermiculite was expanded. The product had a density of about 50 lbs./cu. ft., was hard, relatively dust free, free flowing, exhibited substantially little effects from hygroscopisity when held in 2 ply paper bags for a period of three months and did not cake.

Example 3

A sulfur-vermiculite product was prepared that was suitable for agricultural use in fertilizers to supply elemental sulfur. The procedure of Example 1 was used except 800 grams of flowers of sulfur was added to the melting vessel and heated to a temperature of about 350–380° F. and 220 pounds of unexpanded No. 3 vermiculite was added to the molten mass at a substantially constant rate over a period of 1 to 2 minutes while the agitation was continued. The vermiculite submerged in the hot liquid immediately as it was added to the hot liquid mass.

The vermiculite adsorbed substantially all of the molten salt mix within 3 to 5 minutes after the completion of the vermiculite addition. The mass was similar to the mass of Example 1 but a little more liquid. It was still quite stiff and viscous.

The entire mass was scraped out of the melting vessel, broken up, and screened as in Example 1. A very small quantity of fines passed through the screen and was recovered and added to the melting vessel during the processing of a subsequent batch immediately after the completion of the vermiculite addition.

The vermiculite was expanded. The product had a bulk density of about 56.6 lbs./cu. ft., was hard, free flowing, exhibited substantially little effects from hygroscopisity when held in 2 ply paper bags for a period of 3 months and did not cake. There was a slight tendency for the sulfur on the surface of the particles to crystallize and brush off as fine dust. However, the product could still be rated as relatively dust free when compared with most other sulfur containing materials.

Example 4

A 20–10–10 fertilizer was prepared in which the sulfate content was over 10% on an $SO_4$ weight basis. The procedure of Example 1 was used except 1040 grams of ammonium nitrate (35% N) and 330 grams of mono-ammonium phosphate (12–61–0) were added to the melting vessel. 255 pounds of unexpanded No. 3 vermiculite was added to the molten mass at a substantially constant rate over a period of 1 to 2 minutes while agitation was continued. The vermiculite submerged in the hot liquid immediately as it was added to the hot liquid mass. Substantially all of the molten salt mix was adsorbed by the vermiculite within 2 minutes after the completion of the vermiculite addition and the mass had substantially the same characteristics as the mass of Example 1.

The vermiculite had expanded. Then 400 pounds of sulfate of potash 0-0-50 was added to the plastic mass. The sulfate of potash is added separately because its melting point is about 2000° F. and the other salts become unstable at such a high temperature.

The entire mass was scraped out of the melting vessel, broken up and screened as in Example 1. A very small quantity of fines passed through the screen and was recovered and added to the melting vessel during the processing of a subsequent batch immediately after the completion of the vermiculite addition.

The product had a density of about 43 lbs./cu. ft., was hard, relatively dust free, free flowing, exhibited substantially little effects from hygroscopisity when held in 2 ply paper bags for a period of 3 months and did not cake. The sulfate of potash appears to be predominantly adsorbed on the outer surface of the vermiculite.

We claim:

1. The process of expanding vermiculite comprising preparing a mixture of a liquid heat carrier and unexpanded vermiculite, heating said liquid heat carrier in the mixture to a temperature above 212° F. to bring about the expansion of the vermiculite in the heat carrier.

2. The process of claim 1 wherein said liquid heat carrier is adsorbed by said thermally expanding material.

3. The process of claim 1 wherein the liquid heat carrier is a molten material and wherein said molten material is first prepared and said vermiculite is then added to the molten material whereby the vermiculite is expanded and the molten material is adsorbed by the vermiculite.

4. The process of claim 3 wherein said molten material is at a temperature of 320–550° F. when the vermiculite is added.

5. The process of claim 4 wherein the molten material is at a temperature of 400–450° F. when the vermiculite is added.

6. The process of claim 5 wherein the molten material includes nitrogen and phosphorus containing materials selected from the group consisting of ammonia, nitrates, phosphates and compounds and mixtures thereof.

7. The process of claim 4 wherein tthe vermiculite with the adsorbed material is cooled, broken up and screened to between 8 to 50 U.S. Standard screen size.

8. The process of claim 4 wherein the vermiculite has a particle size that is predominantly between 10 and 30 U.S. Standard screen size.

9. The process of claim 1 wherein the heat carrier material is applied as a coating on the exterior of the expanded vermiculite particle.

10. A vermiculite product comprising about 5–20% by weight exfoliated vermiculite and about 80–95% by weight materials adsorbed thereon.

11. The product of claim 10 wherein said materials are fertilizer ingredients.

References Cited

UNITED STATES PATENTS 3,357,814   12/1967   Getsinger _____ 71—62 X

S. LEON BASHORE, Primary Examiner

R. D. BAJEFSKY, Assistant Examiner

U.S. Cl. X.R.

71—64; 106—122; 252—378

PO-1050
(5/69)

UNITED STATES PATENT OFFICE
CERTIFICATE OF CORRECTION

Patent No. 3,459,531      Dated August 5, 1969

Inventor(s) Judson K. Chapin Jr. and David W. Robinson

It is certified that error appears in the above-identified patent and that said Letters Patent are hereby corrected as shown below:

Column 7; line 9, "220 pounds" should read -- 220 grams --;

line 42, "255 pounds" should read -255 grams --;

line 51, "400 pounds" should read -- 400 grams --.

**SIGNED AND
SEALED
MAR 3 - 1970**

(SEAL)
Attest:

Edward M. Fletcher, Jr.
Attesting Officer

WILLIAM E. SCHUYLER, JR.
Commissioner of Patents